ns351B2

United States Patent
Aqvist et al.

(10) Patent No.: US 8,320,351 B2
(45) Date of Patent: Nov. 27, 2012

(54) AUTOMATIC HANDLING OF NEIGHBOUR CELLS

(75) Inventors: Hans Aqvist, Jäfälla (SE); Wayne Hsiao, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 344 days.

(21) Appl. No.: 12/602,428

(22) PCT Filed: May 30, 2007

(86) PCT No.: PCT/SE2007/050386
§ 371 (c)(1),
(2), (4) Date: Nov. 30, 2009

(87) PCT Pub. No.: WO2008/147267
PCT Pub. Date: Dec. 4, 2008

(65) Prior Publication Data
US 2010/0177758 A1    Jul. 15, 2010

(51) Int. Cl.
*H04B 7/216* (2006.01)
(52) U.S. Cl. .................. 370/342; 455/434
(58) Field of Classification Search .......... 370/252, 370/254, 255, 328, 331, 333, 335, 342, 441; 455/434
See application file for complete search history.

(56) References Cited

U.S. PATENT DOCUMENTS

| 6,285,874 | B1 | 9/2001 | Magnusson et al. |
| 2006/0211402 | A1* | 9/2006 | Hofmann ............... 455/355 |
| 2007/0207822 | A1* | 9/2007 | Andersson et al. ........... 455/502 |
| 2007/0213086 | A1* | 9/2007 | Claussen et al. ............ 455/513 |
| 2008/0014934 | A1* | 1/2008 | Balasubramanian et al. 455/434 |
| 2008/0069028 | A1* | 3/2008 | Richardson ............ 370/328 |
| 2008/0070506 | A1* | 3/2008 | Ore ..................... 455/63.2 |
| 2008/0153533 | A1* | 6/2008 | Claussen et al. ........... 455/522 |

FOREIGN PATENT DOCUMENTS

| EP | 1377101 B1 | 9/2006 |
| GB | 2 311 912 A | 10/1997 |
| WO | WO 2005101890 A1 | 10/2005 |

* cited by examiner

*Primary Examiner* — Brian D Nguyen

(57) ABSTRACT

A method for a cellular system with cells which can accommodate user terminals, UEs and respective base stations, and also an RNC for the control of the base stations, comprising maintaining a Neighbor Cell list and an Active Set list in the RNC, and letting a UE in a cell measure and report transmissions from Neighbor Cells to its RNC. The method comprises letting the UE make Detected Set measurements and report them to its RNC. The method also comprises letting the RNC maintain a third list of parameters for other cells, and letting the RNC use received Detected Set measurement reports from a UE and said third list to determine the identity of cells of a Detected Set, and using the identified cells in the Detected Set report to update the first UE's Active Set.

11 Claims, 3 Drawing Sheets

US 8,320,351 B2

AUTOMATIC HANDLING OF NEIGHBOUR CELLS

TECHNICAL FIELD

The present invention discloses a method and device for automatic handling of neighbour cells in a WCDMA system.

BACKGROUND

A wireless cellular telephony system will comprise a number of cells, each of which can accommodate a number of user terminals, UEs. The system will also comprise a function via which the traffic to and from the UEs in a cell is routed, a function which in a WCDMA system is known as the NodeB, sometimes also referred to as the Radio Base Station, RBS, of the cell.

A WCDMA system also comprises a function for the control of the NodeBs, a so called Radio Network Controller, RNC, a function which also carries out a certain degree of control of the UEs in a cell whose NodeB it controls. Each cell with its NodeB, and the UEs in that cell, will thus be tied to, and controlled by, a particular RNC in the system. The RNC of a cell maintains a list of cells which are in the vicinity of the cell in question. This list is usually known as the Neighbour cell list.

A UE of a WCDMA system can be in communication with more than one cell, or rather, the NodeB of that cell, at a time. The cells that the UE is in communication with at the moment are known as the Active Set of that UE. The RNC which controls a UE keeps a list of the cells of the Active Set of the UE.

A UE in a cell in a WCDMA system listens for transmissions from NodeBs of other cells, and reports such transmission to its RNC via the NodeB of the cell. If transmissions from a NodeB of a cell in the Neighbor list of the UE's cell are detected and subsequently reported to the RNC of the UE, the RNC can add that cell to the UE's AS. However, if transmissions from a NodeB of a cell which is not included in the Neighbor cell list of the UE's cell are detected by a UE, those cells can not be identified.

To have correct neighbour cell lists is important for a number of reasons, one of them being that "missing" neighbours will cause dropped calls and interference in the network. In present systems, a neighbour cell list for a typical WCDMA cell will contain approximately 15-20 neighbour cells, all of which must be identified and defined manually.

As can be understood, to define and maintain proper and correct neighbour cell lists is a necessary but large task for operators of WCDMA systems, in particular in a system which is expanding, and in which many new cells are added.

SUMMARY

As has emerged from the description given above, there is a need for a method by means of which the work involved in defining and maintaining neighbour cell lists for WCDMA cells can be reduced compared to present systems. The method should also enable identification of NodeBs whose transmissions are detected by a UE, even if they or their cells are not included in the Neighbour list of the cell in which the detecting UE is at the moment.

This need is addressed by the present invention in that it discloses a method for use in a wireless cellular communications system in which there is a number of cells which each can accommodate a number of user terminals, UEs.

The traffic to and from the UEs in each cell is routed via a base station of the cell, and there is also in the system a function for the control of these base stations.

The method of the invention comprises:
letting the control function of the base station of a first cell maintain a first list of cells which are in the vicinity of the first cell, a Neighbour Cell list, and a second list of cells which a first UE in the first cell is in communication with, the so called Active Set,
letting the first UE measure and report transmissions from base stations in Neighbour Cells to the control function of the base station of the first cell,
letting the first UE detect transmissions from base stations of cells which are not Neighbour cells of the first cell, so called Detected Set measurements, and report them to the controlling function of the base station of the first cell.

The method of the invention also comprises:
letting the control function of the base station of the first cell maintain a third list of parameters for other cells within a certain distance of the first cell,
letting the control function of the base station of the first cell use received Detected Set measurement reports from the first UE and the third list in order to determine the identity of the cell or cells of a Detected Set,
letting the control function of the base station of the first cell use the identified cell or cells in the Detected Set report to update the first UE's Active Set.

Thus, by means of the method of the invention, cells which have been detected by a UE can be added to that UE's AS, although the detected cells are not in the neighbour cell list of any of the cells in the UE's active set. This and other advantages of the present invention will become obvious from the detailed description given below.

The present invention also discloses a control function for base stations for use in a wireless cellular communications system, in particular a WCDMA system.

BRIEF DESCRIPTION OF THE DRAWINGS

The invention will be described in more detail in the following, with reference to the appended drawings, in which.

DETAILED DESCRIPTION

Figure 1:
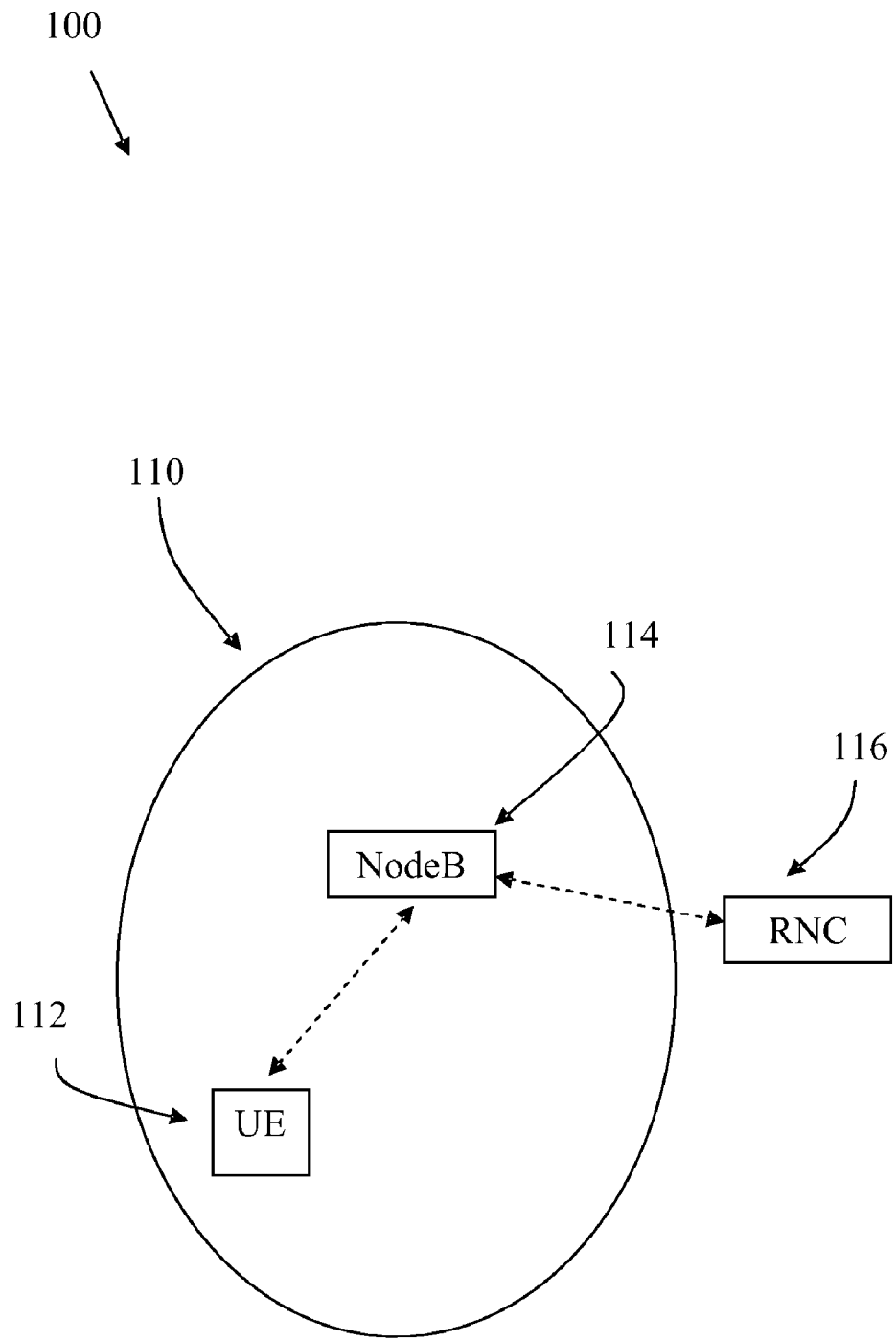
FIG. 1 shows an overview of a part of a system in which the invention may be used.

FIG. 1 shows a schematic view of a part of a system 100, such as a WCDMA system, in which the present invention may be applied. The system 100 is a cellular system, and thus comprises a number of cells, each of which can accommodate a number of user terminals, UEs. One of the cells 110 of the system 100 is shown in FIG. 1, with one UE 112 in the cell. For reasons of clarity, only one cell and one UE are shown in FIG. 1, although it should be made clear that the cell 110 can comprise a number of UEs, and that the system 100 can comprise a number of other cells in the vicinity of the cell 110.

In the system 100, there is also a function 114 via which the traffic to and from the UEs in a cell is routed. This is a function which is present in cellular systems, but which has different names in different systems or standards. The present invention is mainly intended for a WCDMA system, in which the function in question is usually referred to as NodeB. However, the invention may also be applied in other cellular systems, in which said function bears different names, such as "Radio Base Station", RBS, "Base Transceiver Stations", BTS, etc, so the term "NodeB" should in this description be seen as a generic name for said function, instead of being used to tie the invention to a particular system or standard.

The system 100 also comprises a function for the control of the NodeB, said function being known in the WCDMA system as the Radio Network Controller, RNC, shown as 116 in FIG. 1. An RNC can also carry out certain control functions of the UEs in a cell, which is done via the NodeB of the cell.

It can be mentioned here that in this description reference will be made to communication between an UE and its RNC. The term "its RNC" refers to the RNC which carries out control functions of the UE in question, and the communication in question will be made via the NodeB of the UE. The interfaces between the UE-NodeB-RNC are well known to those skilled in the art, and are not of primary importance to the invention, so these interfaces will not be described in depth here. Instead, reference will merely be made to communication between an UE and "its RNC".

Since the WCDMA system uses codes to differentiate between different cells, the system 100 will usually only operate on one frequency, at least within a particular geographical area. A UE such as the UE 112 in the cell 110 will thus be able to "hear" (detect) transmissions from NodeBs of other cells in the system, usually those in the vicinity of the cell 110, but the cells that are "heard" may also occasionally be more distant cells In the following, reference may be made to a UE which listens for "other cells", or which is "in communication with other cells", or "detects transmissions from other cells", etc. These phrases are used as alternatives to saying that the UE listens to transmissions from a NodeB of another cell, is in communication with a NodeB of another cell, or that it detects transmissions from NodeBs of other cells, etc.

In the WCDMA system, UEs may be requested by their controlling RNC to listen for transmissions from other cells, and to report detected transmissions from other cells to their RNC. An RNC of the system 100 has, for each cell of a NodeB that it controls, a list of cells which are in the vicinity of that cell, the Neighbour cell list. The Neighbour cell list includes a number of parameters for each cell in the list, including, for example the cell's scrambling code and possibly also the output power level, parameters which can be communicated between an RNC and the UEs which it controls.

The detected transmissions from other cells, or their contents, i.e. parameters such as scrambling code, scrambling code, path loss, Ec/No (an interference level indicator), Rscp (Received signal code power) can be reported, to the RNC in order to update the reporting UE's so called Active Set, AS, which is the set of cells that the UE is in communication with at present, and which the RNC maintains a list of.

However, a problem arises if a UE reports that it has detected NodeB transmissions from a cell which is not in the Neighbour lists of any of the cells in the UE's active set. If such a cell/NodeB is detected by a UE and reported to the UE's RNC, then the detected cell cannot be included in the UE's AS. Such cells, i.e. cells which are not in the neighbour cell lists of any cell in the UE's AS can still be detected by the UE, for example by means of a function known in the 3GPP as detected set, DS, measurements. The DS function is a function by means of which a UE attempts to detect transmissions from NodeBs of all cells, regardless of whether or not they are included in the neighbour cell lists of the cells in the UE's AS. When a UE detects such a DS transmission, it will send a measurement report comprising the scrambling code or codes detected in the DS measurement to its RNC.

In brief, and as will be explained in more detail in the following, by means of the present invention, an RNC which receives a DS measurement report will be able to use the contents of the report to identify the cell or cells which have been detected during the DS measurement. The identification of the cell or cells will, in a preferred embodiment, take place in real time, or as near real time as possible.

Once a cell in a DS measurement report has been identified by the RNC of the reporting UE, the cell identity may be used to update the AS list of the reporting UE. Usually, the updating of the AS list will comprise adding the newly identified cell to the AS list, but it may also comprise dropping one or more other cells from the AS list.

Figure 2:
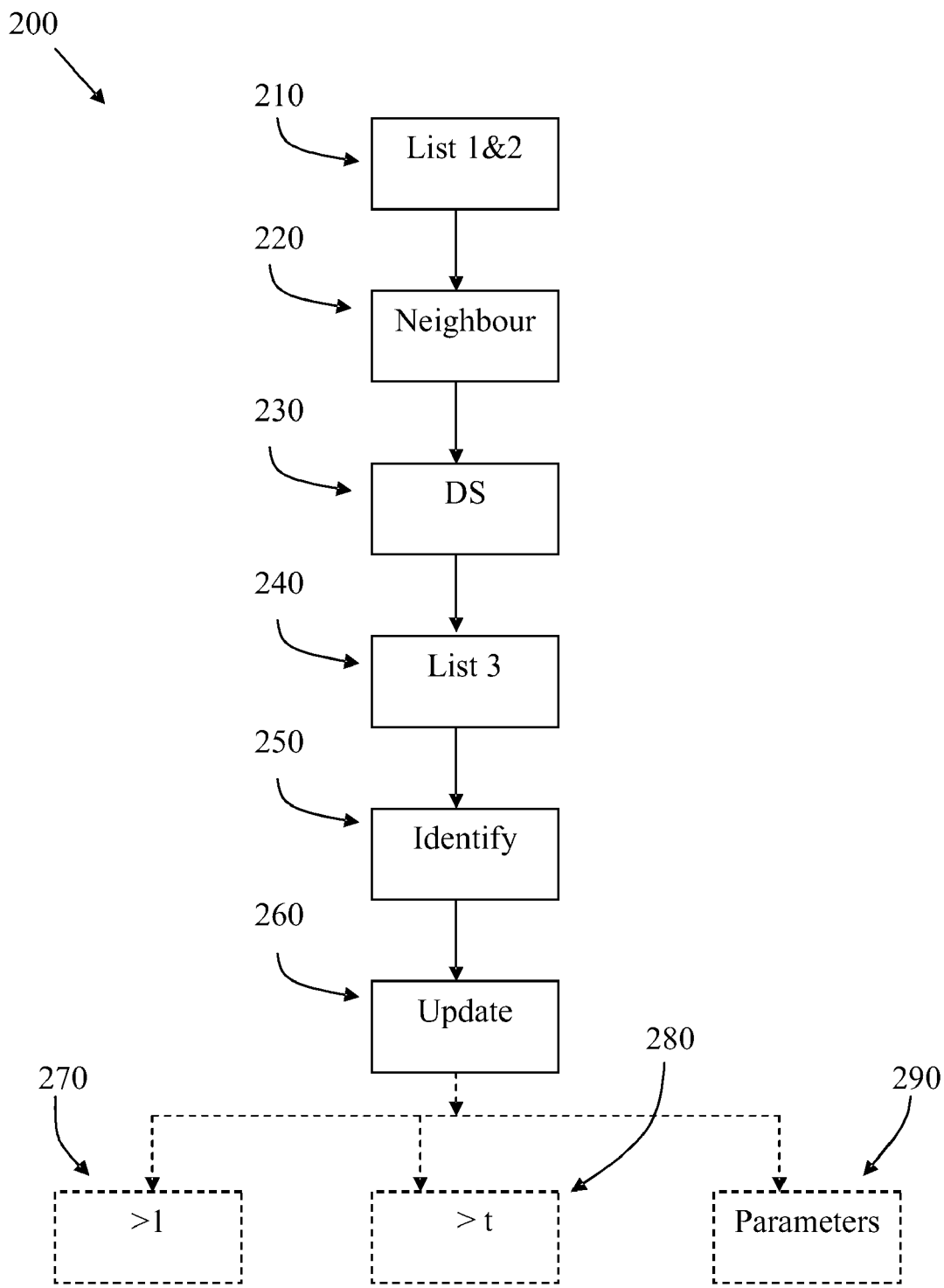
FIG. 2 shows a flow chart of a method of the invention.

FIG. 2 shows a schematic flow chart of a method 200 of the invention. Steps which are options or alternatives are shown with dashed lines.

As indicated in step 210, according to the method of the invention, the control function, i.e. in this case the RNC, of a base station of a first cell in the system will maintain a first list of cells which are in the vicinity of the first cell, a Neighbour Cell list, as well as a second list of cells which a first UE in the first cell is in communication with, the so called Active Set list. If the active set of a UE contains more than one cell, the neighbour cell lists from all of the cells in the active set will be combined by the RNC of the UE, and sent to the UE.

Step 220 shows that said first UE measures and reports transmissions from Neighbour Cells to its RNC. As indicated in step 230, the first UE will detect transmissions from cells which are not Neighbour cells to any cell in the Active Set, so called Detected Set measurements, and will report the results of these measurements to its RNC.

Step 240 shows that according to the invention, the RNC of the first cell maintains a third list of parameters for other cells within a certain distance of the first cell, and as shown in step 250, the RNC of the first cell uses received Detected Set measurement reports from the first UE in the first cell and the contents of the third list in order to determine the identity of the cell or cells of a Detected Set report.

When a cell or cells in a Detected Set report have been identified, they may be used to update the first UE's Active Set, which is shown in step 260. The updating will usually comprise including the newly identified cell or cells in the AS, and may also comprise dropping one or more cells from the AS.

In a particular embodiment of the invention, a cell in a Detected Set report must be included in a certain predetermined number of Detected Set reports in order to be added to the first UE's Active Set. In other words, such a cell must be included in more than one DS report. This is shown in step 270.

In another embodiment, the number of Detected Set reports of step 270 must be received by the RNC within a certain predetermined period of time in order for the Detected Set cell to be included in the AS list of the first UE. In a version of this embodiment, the functionality can also be turned on and off separately for different DS cells and/or for different Active Set cells.

As mentioned above, as indicated in step 280, the RNC of a first cell of the system will, according to the invention, maintain a third list of parameters for other cells within a certain distance of the first cell, a list which is used according to the invention in order to identify cells in DS reports.

The parameters in the third list can comprise more or less any parameters which are deemed necessary in order to carry out said identification, as indicated in step 290. However, in a preferred embodiment, the third list includes one or more of the following:

the position of the cells in the list, e.g. their latitude and longitude, the scrambling code of the cells, the antenna direction or directions of the cells.

Hence, when a UE reports DS measurements, the report will usually comprise the scrambling codes of detected cells, as well as possibly the Down Link Pilot Channel, DL CPICH Ec/No and DL CPICH Rscp values. It is also possible to request and receive values such as path loss.

The RNC may then use the scrambling codes and other information comprised in the DS report, together with the contents of the third list, in order to identify the cells in the DS report. Suitably, the identification (step 250 of the flow chart in FIG. 2) can be done in the following manner:

The position of the cells comprised in the third list is used to calculate the distance from the Active Set cell or cells to the cells which are "candidates" for the DS cells, using the reported scrambling code or codes. Using the antenna direction or directions of the "candidate" cells, which is information that is also comprised in the third list, a path loss calculation can be performed, by means of which the most probable identity of the DS cell or cells can be determined.

When the most probable cell has been identified, it can be added to the AS list as any normally defined neighbour cell, or it can replace one of the cells which are already in the AS of the reporting UE. As an alternative, the "threshold procedure" mentioned above, i.e. a certain number of detections or a certain number of detections within a certain amount of time may be required in order for a cell to be entered on the AS list of a UE.

Figure 3:
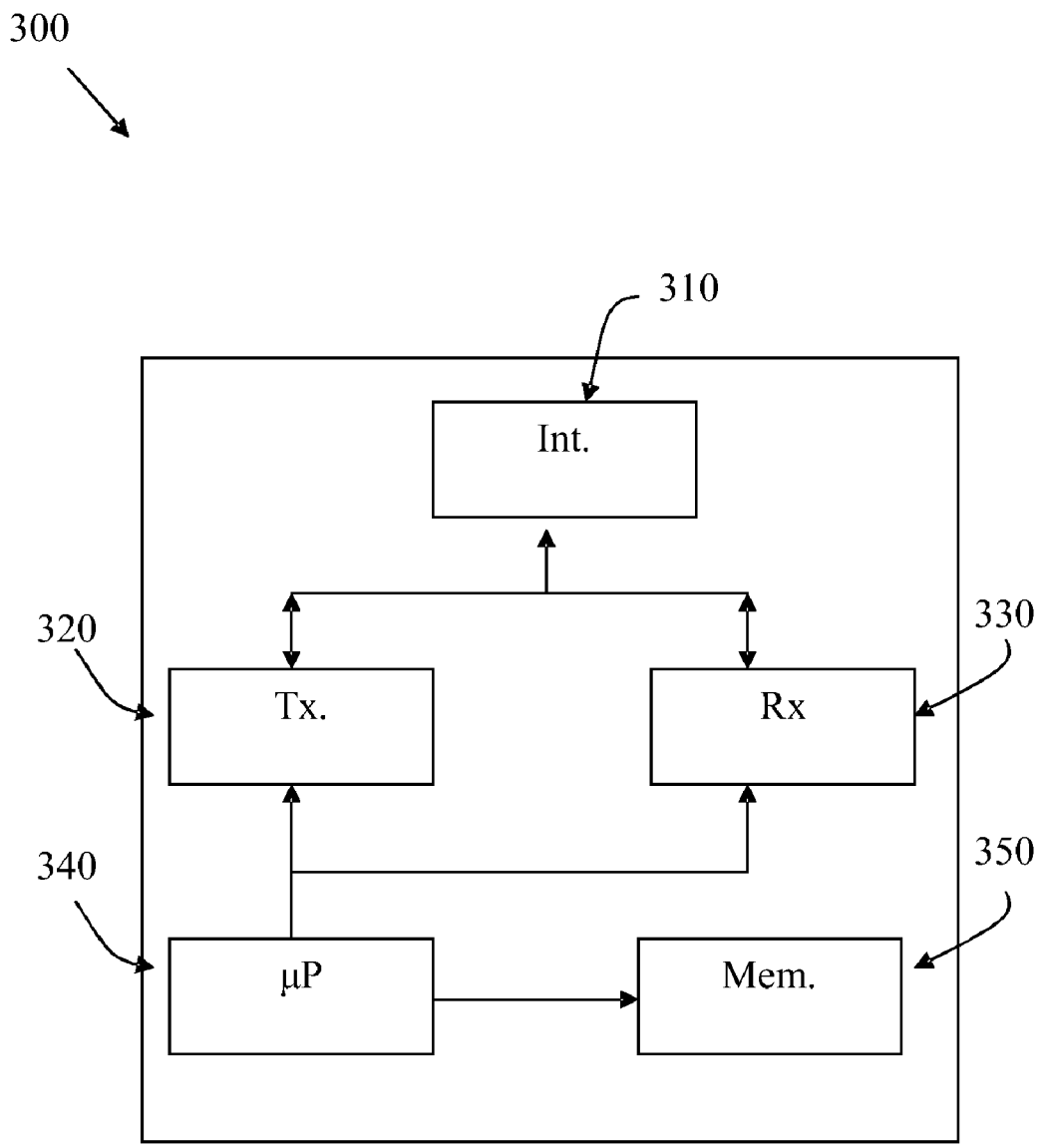
FIG. 3 shows a schematic block diagram of a controlling node in the system according to the invention.

FIG. 3 shows a schematic block diagram of a controlling node 300 of the invention, such as an RNC. As indicated in FIG. 3, the RNC 300 of the invention comprises an interface 310, which is used both for transmission and reception of traffic to/from the NodeBs, and via them the UEs. It is possible for the RNC 300 of the invention to be in contact with the NodeBs and/or UEs which it controls via, for example, the Internet or some other such network, in which case the interface 310 will serve as e the interface towards that network.

The RNC of the invention will also comprise a transmit function 320 and a receive function 330, a control and calculation function, suitably a microprocessor 340 as shown in FIG. 3, and will also comprise memory means, 350.

The Memory means 350 will serve to maintain the Neighbour Cell list and the Active Set lists which have been explained above, in which it may be aided by the processor 340.

The Interface 310 and the receive function 330 can be used to receive reports from an NodeB which the RNC 300 controls regarding detected transmissions by UEs from Neighbour Cells, and also for receiving reports from said NodeB regarding transmissions from cells which are not Neighbour cells of the first cell, i.e. the Detected Set measurements.

The memory means 350, and possibly also the processor 340, can also be used for maintaining the third list of parameters for other cells within a certain distance of the first cell, a list which has been explained previously in this text.

The processor 340 is suitably used to determine the identity of the cell or cells of a Detected Set, by means of the received Detected Set measurement reports from the first UE in the first cell and said third list, in the manner explained above. In addition, the processor 340 is also suitably used to update the first UE's Active Set list by means of the identified cell or cells in the Detected Set.

Finally, it should be mentioned that the measurements carried out by the UE, i.e. the measurements of Neighbour cells and Detected Set cells can be carried out independently by the UE, or they can be ordered from the RNC, as has been mentioned above. In the latter case, the processor 340 may keep track of when the measurements should be carried out, and the interface 310 and the transmit means 320 are used to transmit the commands for measurements to the UE, usually via the NodeB.

The invention is not limited to the examples of embodiments described above and shown in the drawings, but may be freely varied within the scope of the appended claims. For example, the controlling node described above does not need to be an RNC, but may be any other node in the network which can carry out the function described above. In addition, the parameters of the third list described above can be varied, and need not be those included as examples above.

Regarding the third list which has been mentioned throughout in the text above, the cells in the third list may be defined by an operator of the system, but suitably they are selected automatically by the system, based on the distance from the cell for which the list is to be used. Suitably, the cells in the third list are cells which are within a certain predefined distance R from the cell for which the list is to be used.

The invention claimed is:

1. A method for use in a wireless cellular communications system, in which system there is a number of cells, each of which can accommodate a number of user terminals, UEs, with traffic to and from the UEs in a cell being routed via a base station of that cell, and in which system there is also a function for the control of said base stations, the method comprising:

maintaining, by the control function of the base station of a first cell, a first list of cells which are in the vicinity of the first cell, a Neighbour Cell list, and a second list of cells which a first UE in the first cell is in communication with, the Active Set list, measuring and reporting, by said first UE in the first cell, transmissions from base stations in Neighbour Cells to the control function of the base station of the first cell, measuring, by said first UE, transmissions from base stations of cells which are not Neighbour cells of the first cell, Detected Set measurements, and reporting said Detected Set measurements to the control function of the base station of the first cell, maintaining, by the control function of the base station of the first cell, a third list of parameters for other cells within a certain distance of the first cell, wherein the parameters of the cells in the third list include the position of the cells, and the antenna direction or directions of the cells, using, by the control function of the base station of the first cell, the identified cell or cells in the Detected Set report to update the first UE's Active Set, using, by the control function of the base station of the first cell, received Detected Set measurement reports from the first UE and said third list in order to determine the identity of the reported cell or cells of a Detected Set by using the position and antenna direction of candidate cells in the third list to perform a path loss calculation to determine the identity of a Detected Set Cell.

2. The method of claim 1, according to which a cell in a Detected Set report must be included in a certain predetermined number of Detected Set reports in order to be added to the first UE's Active Set.

3. The method of claim 2, according to which said number of Detected Set reports must be received by the control function of the first base station within a certain predetermined period of time in order for a Detected Set cell to be included in the Active Set of the first UE.

4. The method of claim 1, according to which the position of the first UE is used when determining the identity of the cell or cells in a Detected Set.

5. The method of claim 4, according to which the Active Set list of a first UE is used in order to calculate the position of the first UE, and the position is used when determining the identity of the cell or cells in a Detected Set.

6. The method of claim 1, being applied to a WCDMA system.

7. The method of claim 1, according to which the control function of the first base station is the Radio Network controller, RNC, of a WCDMA system.

8. A node for use in a wireless cellular communications system in which system there is a number of cells, each of which can accommodate a number of user terminals, UEs, traffic to and from the UEs in a cell routed via a base station of the cell, the node being intended to serve as a controlling node for at least a first of said base stations, the node comprising:

means for maintaining a first list of cells which are in the vicinity of a first cell of the first base station, a Neighbour Cell list, and a second list of cells which a first UE in the first cell is in communication with, the Active Set list, means for receiving from said first UE, via the first base station, reports regarding detected transmissions from Neighbour Cells, means for receiving from said first UE, via the first base station, reports regarding detected transmissions from base stations of cells which are not Neighbour cells of any cell in the active set, Detected Set measurements, means for maintaining a third list of parameters for other cells within a certain distance of the first cell, wherein the parameters of the cells in the third list include the position of the cells and the antenna direction or directions of the cells;

means for using the identified cell or cells in the Detected Set report to update the first UE's Active Set list;

means for using Detected Set measurement reports from the first UE in the first cell and said third list in order to determine the identity of the reported cell or cells of a Detected Set, by using the position and antenna direction of candidate cells in the third list to perform a path loss calculation to determine the identity of a Detected Set cell.

9. The node of claim 8, in which a cell in a Detected Set report from the first UE must be included in a certain predetermined number of Detected Set reports in order to be added to the first UE's Active Set.

10. The node of claim 9, in which said number of Detected Set reports must be received within a certain predetermined period of time in order for a Detected Set cell to be included in the Active Set of the first UE.

11. The node of claim 8, being a Radio Network Controller, RNC, in a WCDMA system.

* * * * *

UNITED STATES PATENT AND TRADEMARK OFFICE
CERTIFICATE OF CORRECTION

| | | |
|---|---|---|
| PATENT NO. | : 8,320,351 B2 | Page 1 of 1 |
| APPLICATION NO. | : 12/602428 | |
| DATED | : November 27, 2012 | |
| INVENTOR(S) | : Aqvist et al. | |

It is certified that error appears in the above-identified patent and that said Letters Patent is hereby corrected as shown below:

On the Face Page, in Field (75), under "Inventors", in Column 1, Line 1, delete "Jäfälla" and insert -- Järfälla --, therefor.

Signed and Sealed this
Second Day of April, 2013

Teresa Stanek Rea
*Acting Director of the United States Patent and Trademark Office*